United States Patent [19]

Otani et al.

[11] Patent Number: 5,058,125
[45] Date of Patent: Oct. 15, 1991

[54] LASER OSCILLATOR

[75] Inventors: Akihiro Otani; Shuji Ogawa, both of Aichi, Japan

[73] Assignee: Mitsubishi Denki K.K., Tokyo, Japan

[21] Appl. No.: 573,757

[22] Filed: Aug. 28, 1990

[30] Foreign Application Priority Data

Sep. 1, 1989 [JP] Japan ................................ 1-226737

[51] Int. Cl.$^5$ ................................................ H01S 3/03
[52] U.S. Cl. ........................................ 372/109; 372/61
[58] Field of Search ...................... 372/109, 61, 81, 83

[56] References Cited

U.S. PATENT DOCUMENTS 4,637,031  1/1987  Gürs et al. ............................ 372/61

FOREIGN PATENT DOCUMENTS 61-90484   5/1986  Japan .
63-228775  9/1988  Japan .

Primary Examiner—James W. Davie
Attorney, Agent, or Firm—Sughrue, Mion, Zinn, Macpeak & Seas

[57] ABSTRACT

A laser oscillator having an enclosure serving as a vacuum vessel which is capable of preventing an electric discharge from occurring between a pair of electrodes and the inner surface of the vacuum vessel. The laser oscillator is made smaller in size, lower in total weight, and lower in manufacturing cost while securing a sufficient insulation gap between the electrodes and the inner surface of the vacuum vessel.

2 Claims, 2 Drawing Sheets

LASER OSCILLATOR

BACKGROUND OF THE INVENTION

The present invention relates to a laser oscillator having a vacuum vessel, and more particularly to a shape of a vacuum vessel for use in a laser oscillator.

FIGS. 1(a) and 1(b) are schematic diagrams illustrating a cross-sectional side view and a cross-sectional front view of an example of a laser oscillator which has been disclosed in Published Unexamined Japanese Patent application No. 62-224990, respectively.

In FIGS. 1(a) and 1(b), reference numeral 1 designates a metallic enclosure which forms a vacuum vessel in which a laser medium gas is sealed; 2, a supporting frame disposed at the bottom of the vessel 1; 3, a heat exchanger which cools the laser medium gas; 4, an air blower which circulates the laser medium gas through a gas duct 6 serving as a passage; 5, a pair of electrodes facing each other; 7a and 7b, brackets mounted on the top of the vessel 1, respectively; and 8a, 8b and 8c, guide bars, the guide bars 8a and 8b being attached to the brackets 7a and 7b, respectively.

Supporting plates 9a and 9b which are made of aluminum or copper, are supported by the guide bars 8a, 8b and 8c. The plates 9a and 9b are provided with a half reflection mirror 10 and a total reflection mirror 11, respectively. Reference numeral 12 designates a pair of metallic bellows which connect between the vessel 1 and the support plates 9a and 9b respectively, while 13 denotes a laser beam.

In laser oscillation using a laser oscillator as constructed above, the air blower 4 is first actuated to produce a laser medium gas flow in a direction indicated by an arrow so that the gas flow circulates in the passage formed by the space between the pair of electrodes 5, the gas duct 6, and the heat exchanger 3 in this order.

Next, a high voltage is applied across the pair of electrodes 5 to generate a discharge, so that a laser medium gas is excited to emit a light having a wavelength of, in the case of $CO_2$ for example, 10.6 m. This light in turn is amplified with an optical resonator constituted by the total reflection mirror 11 and the half reflection mirror 10 until it is released as a laser beam at the half reflection mirror 10.

To obtain a stable laser output in this process, the variations in the angle and position of the reflection mirrors (10) and (11) constituting the resonator have to be minimized. Amber or other material having a small value of linear expansion coefficient is employed as a material for the guide bars 8a, 8b and 8c supporting the support plates 9a and 9b to which the reflection mirrors 10 and 11 are fixed.

In laser oscillation, it is necessary to provide a prescribed insulation distance A between the electrodes 5 and the vessel 1 as shown in FIG. 1(a) because a high voltage is applied between the paired electrodes 5.

Because the pressure of laser medium gas at time of laser oscillation is as low as approximately 1/10 of the atmospheric pressure, the insulation distance A is set to a relatively large value. If the prescribed insulation distance A cannot be secured, a discharge may occur between the electrodes 5 and the vessel 1 resulting in the generation of heat and burning at the discharging portion. Besides, undesired gas such as a hydrocarbon (HC) or other volatile gases, which in turn may deteriorate the laser medium gas may be generated at the heated portion. In the case where, for example, a carbon dioxide gas ($CO_2$) is employed as the laser medium gas, a chemical reaction of $CO_2$ and the above-mentioned HC decreases $CO_2$, resulting in a trouble of decreases in the laser oscillation efficiency. To guard against this trouble, the enclosure 1 is elongated vertically to secure the insulation distance A.

Note that this insulation distance A must be 50 mm or more usually, although it depends on the laser medium gas pressure, its composition, the shape of electrodes, their material, and voltage applied to the gap between the elelctrodes.

As described above, to prevent the deterioration of a laser medium gas or the descrease in laser oscillation efficiency, it is necessary to secure the prescribed insulation distance A between the enclosure 1 and the electrodes 5 in the convetional enclosure of a laser oscillator. Consequently, the conventional device is disadvantageous in that the miniaturization of the vessel 1 is restricted.

SUMMARY OF THE INVENTION

In view of the above, it is an object of the present invention to provide a laser oscillator having a vaccum vessel which can be miniaturized in size or volume while securing the prescribed insulation distance.

The above, and other objects of the present invention are accomplished by the provision of a laser oscillator comprising a plurality of brackets, a pair of supporting members to which a total reflection mirror and a half reflection mirror are respectively provided in such a manner that said reflection mirrors are arranged in parallel with each other and a vacuum vessel which is disposed between said paired reflection mirror support members, in which the vaccum vessel contains electrodes facing to each other and means for circulating a laser medium gas flowing through a gap between said first and second electrodes. The vessel is shaped to have a projected portion to maintain a sufficient insulation clearance with respect to said electrodes and said projected portion is provided between said brackets attached to the outer surface of said vessel.

DESCRIPTION OF THE PREFERRED EMBODIMENT

Figure 2:
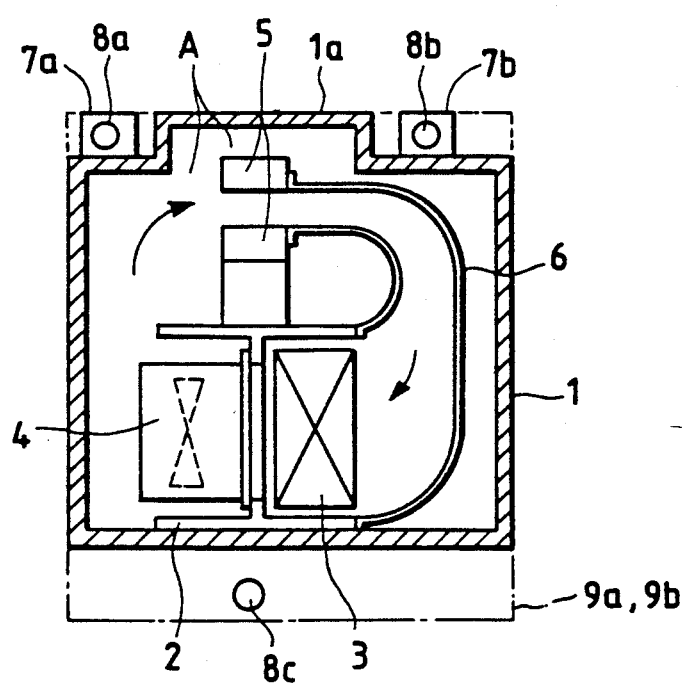
FIG. 2 is a schematic diagram showing a cross-sectional side view of an embodiment of the present invention.

An embodiment of the present invention will be described hereinafter with reference to FIG. 2. In FIG. 2 which is a schematic diagram showing a cross-sectional side view of an embodiment of a laser ocsillator according to the present invention, the same or corresponding portions as those of the conventional laser oscillator bear the same reference numerals and the detailed description therefor is omitted here intentionally.

As shown in FIG. 2, the upper plate of the enclosure 1 which forms a vacuum vessel, is modified to have a projected portion 1a so as to accommodate the upper electrode 5 therein with a prescribed insulation distance A. With such a vaccum vessel as shaped above, when a high voltage is applied between the pair of elcetrodes 5 to generate laser oscillation, an electric discharge is prevented from occurring between the upper surface of the electrodes 5 and an inner surface of the projection 1a of the vessel 1 or between the perpendicular surface of the electrodes 5 and a portion of the vessel 1.

The brackets 7a and 7b having substantially the same height as that of the projection 1a are provided to a portion of the top plate of the vessel 1 other than the projected portion 1a. In other words, the brackets 7a and 7b are provided to the top plate of the vessel 1 in such a manner that the top surfaces of the brackets 7a and 7b form a flush surface with the top surface of the projection 1a.

Figure 1A:
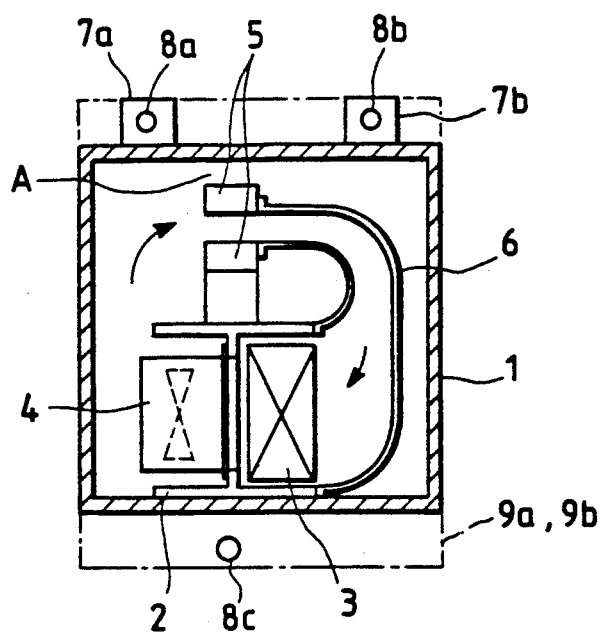
FIGS. 1(a) and 1(b) are schematic diagrams showing a cross-sectional side view and a cross-sectional front view of a conventional laser oscillator, respectively.
Figure 1B:
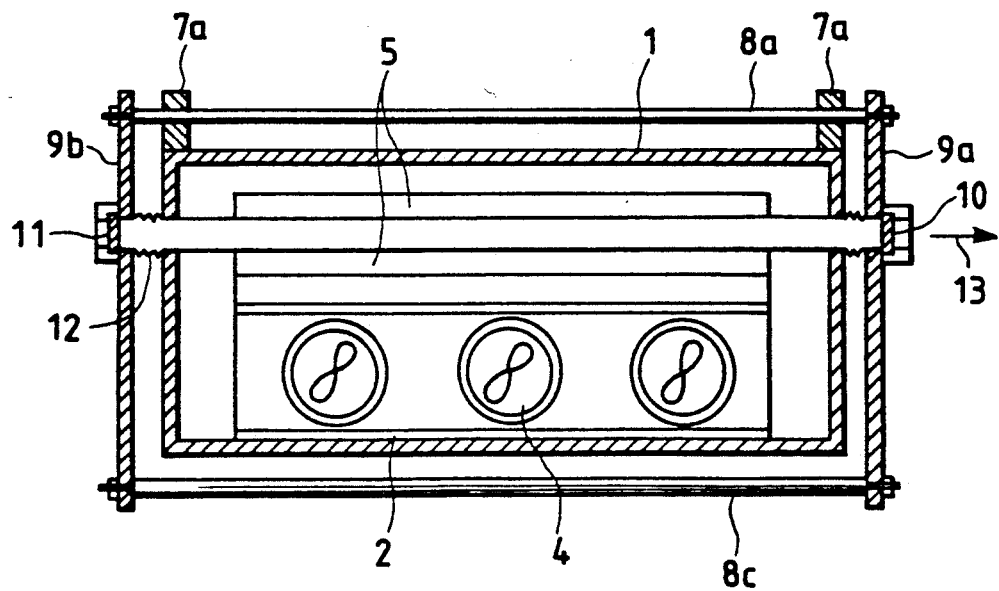

The support plates 9a and 9b to which the partial reflection mirror 10 and the total reflection mirror 11 are respectively provided, are supported by the guide bars 8a, 8b and 8c in the same manner of the conventional one of FIGS. 1a and 1b.

The enclosure serving as the vacuum vessel 1 contains a laser medium gas, the heat exchanger 3, the air blower 4, the paired electrodes 5 and the gas duct 6, so that laser oscillation takes place therein in totally the same way as the conventional oscillation.

As is apparent from the above description, according to the present invention, it is possible to secure the insulation distance A between the electrodes 5 and the enclosure 1 without increasing the total height of the enclosure 1 including the brackets 7a and without 7b and increasing the volume thereof. Therefore, it is possible to prevent an occurrence of electric discharge between the electrodes 5 and the enclosure 1.

Further, according to the present invention, the size of the support plates 9a and 9b can also be decreased to thereby reduce the weight of the aluminum- or copper-made support plates 9a and 9b. This results in reducing the total weight of the laser oscillator. Consequently, the support plates 9a and 9b thus lightened enable reducing the thickness of the guide bars 8a, 8b and 8c supporting the support plates 9a and 9b, resulting in a merit of reducing the cost of those guide bars which are made of such expensive materials as amber.

As described above, the present invention allows for the miniaturization of the enclosure while securing a sufficient insulation distance between the enclosure and a pair of electrodes, because a projection is formed on the upper side of the electrodes of the vacuum vessel containing the oppositely arranged electrodes and a laser medium gas circulating system and also because brackets are mounted on the surface other than that of the projection.

What is claimed is:

1. A laser oscillator comprising:
    a pair of spaced apart supporting members to which a total reflection mirror and a half reflection mirror are respectively disposed such that said reflection mirrors are arranged in parallel with each other;
    a plurality of guide bars extending between and supporting said pair of spaced apart supporting members; and
    a vacuum vessel, in which a laser medium gas is sealed, disposed between said pair of spaced apart supporting members, said vacuum vessel including an upper plate having a plurality of brackets fixed to an outer surface thereof, each of said brackets being attached to a corresponding guide bar;
    wherein said vacuum vessel contains first and second electrodes facing to each other and means for circulating said laser medium gas flowing through a gap between said first and second electrodes, said upper plate of said vacuum vessel having a projected portion thereby forming a space to accommodate one of said first and second electrodes therein at a prescribed insulation distance from an inner surface of said projected portion, said projected portion being disposed between said brackets fixed to the outer surface of said upper plate.

2. The laser oscillator as defined in claim 1, wherein said upper plate of said vacuum vessel is shaped so that a top surface of said projected portion is flush with top surfaces of said brackets.

* * * * *